March 5, 1963     A. J. PROKSA     3,079,843
ROTARY HEAD MILLING ATTACHMENT
Filed Oct. 14, 1959     3 Sheets-Sheet 1
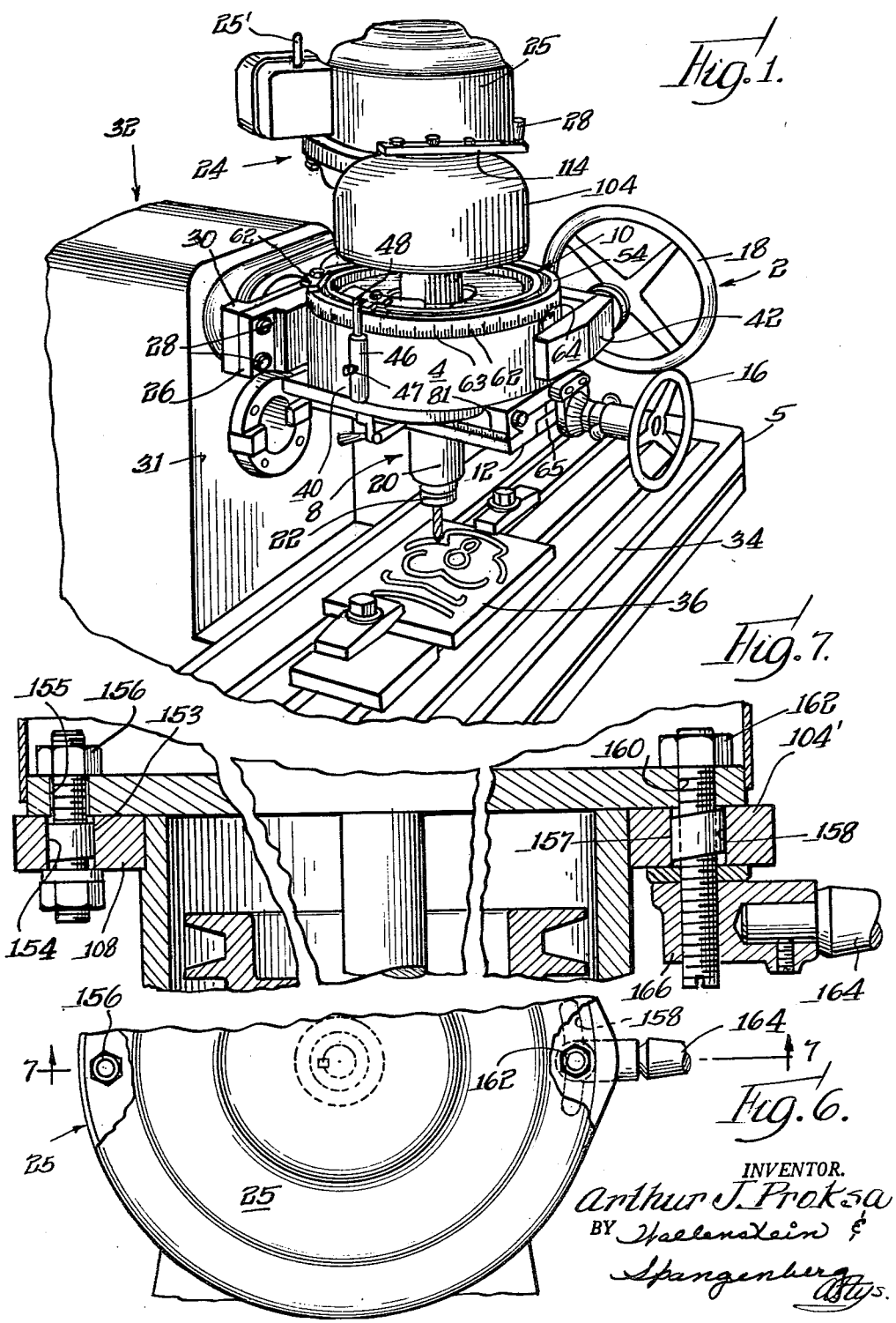
INVENTOR.
Arthur J. Proksa

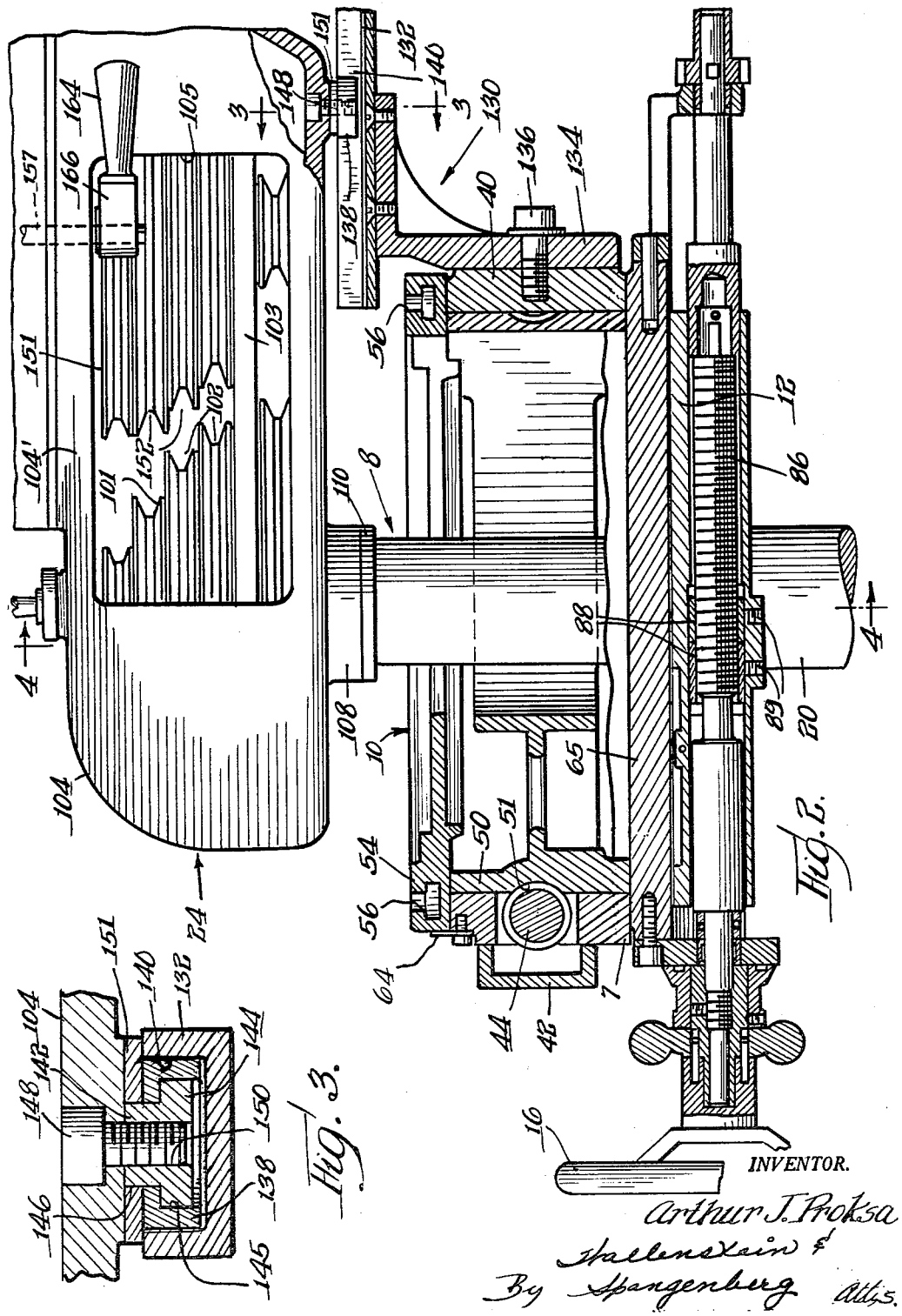

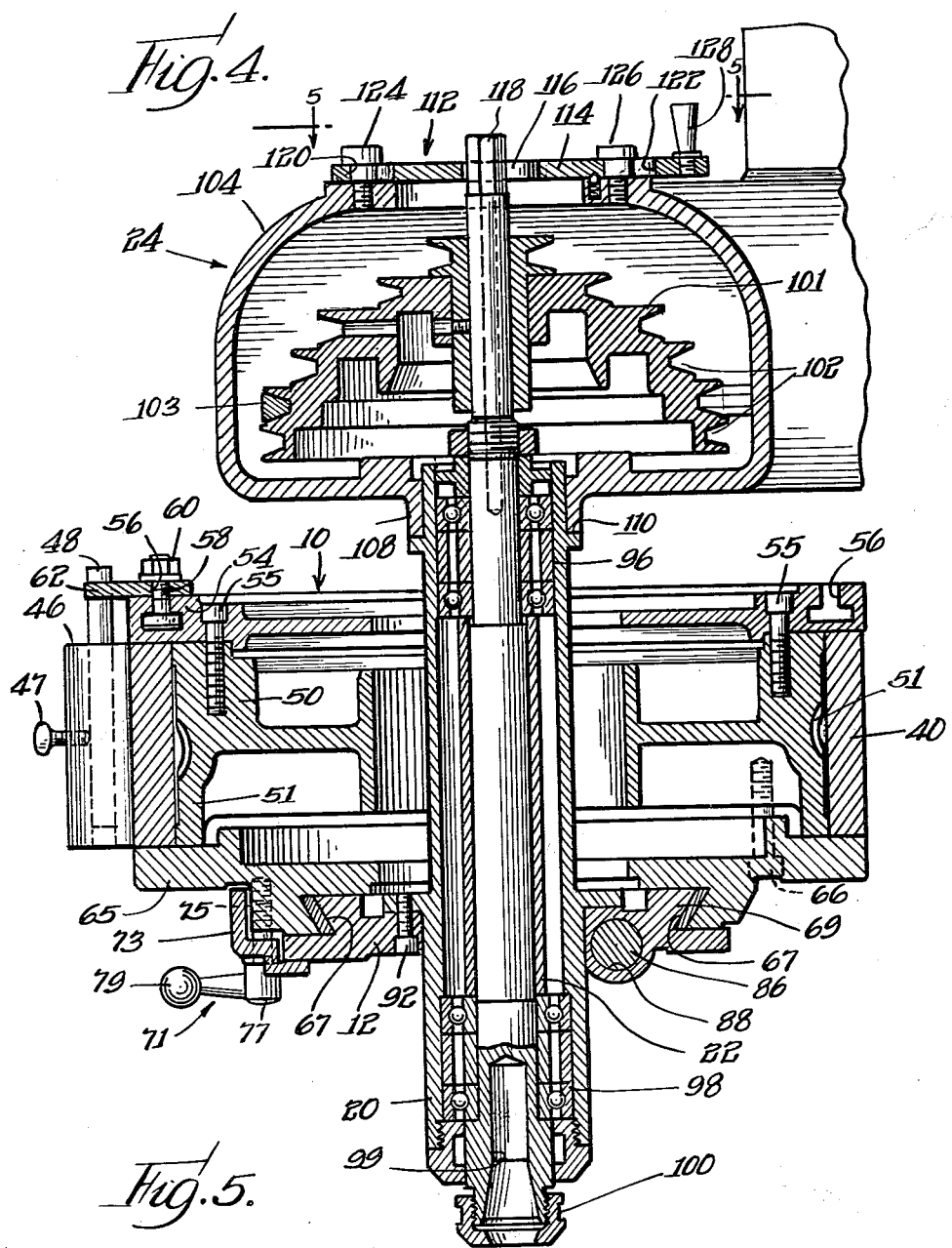

United States Patent Office 3,079,843
Patented Mar. 5, 1963

3,079,843
ROTARY HEAD MILLING ATTACHMENT
Arthur J. Proksa, Elmwood Park, Ill., assignor to Everede Tool Company, Chicago, Ill., a partnership
Filed Oct. 14, 1959, Ser. No. 846,392
1 Claim. (Cl. 90—15)

This invention relates generally to machine tools and more particularly to a rotary head milling attachment designed for use with horizontal or vertical milling machines for conventional or climb precision milling.

Rotary head milling attachments generally comprise a main stationary frame or housing mountable upon the head portion of a conventional milling machine, a rotary frame unit mounted for rotation upon the main stationary frame and a spindle-carrying cross slide carried by the rotary frame unit. The cross slide is radially adjustable upon the rotary frame unit to vary the eccentricity of the spindle axis with respect to the axis of rotation of the rotary frame unit. In some cases, the spindle is driven by a flexible shaft from a motor mounted upon the stationary head portion of the milling machine. In other cases, a direct drive motor unit is provided upon the cross slide where the spacing between the motor and spindle is fixed and the parts coupling the motor to the spindle are rigidly mounted upon the cross slide. The latter direct drive arrangement is generally preferred since this minimizes vibration and enables greater precision in the milling operation.

One disadvantage of the direct drive units heretofore developed for milling attachments is that the various bearing surfaces of the milling attachment must be designed to carry the entire weight of their drive units. Also, these drive units are relatively bulky and often extend to points far removed from the axes of rotation of the associated rotary frame units, with the result that they traverse appreciable areas when their rotary frame units are rotated where they frequently obstruct the operator's access to or view of the work piece upon which precision milling operations are to be performed.

It is, accordingly, an object of the present invention to provide a rotary head milling attachment which overcomes the above-mentioned disadvantages. More specifically, an object of the present invention is to provide a rotary head milling attachment with a direct drive unit where part of the weight of the drive unit is carried by the main stationary frame of the milling attachment. Another object of the present invention is to provide a rotary head milling attachment having a direct drive where the drive unit traverses a relatively small area as the rotary frame is angularly adjusted, so that it does not obstruct the operation view of the work piece.

Still another object of the present invention is to provide a rotary head milling attachment as just described which is a very simple, rugged and of relatively inexpensive construction.

In accordance with the present invention, the direct drive unit of the rotary head milling attachment has a frame unit or housing which is pivotally and slidably mounted at one end upon the main stationary frame of the milling attachment and is pivotally supported at the other end on the cross slide for rotation about an axis coextensive with the spindle axis. An electric motor is carried by the drive unit frame or housing and may be coupled to the spindle by means of a variable speed pulley system or some equivalent direct drive transmission system. With this arrangement at least part of the weight of the drive unit is carried by the main stationary frame of the milling attachment and, due to the sliding and pivotal movement permitted thereon, the drive unit moves along a relatively small path of travel as the rotary frame is rotated even for large spindle eccentricities.

Other objects, advantages and features of the invention will become apparent upon making reference to the specification to follow, the claim and the drawings wherein:

FIG. 1 is a perspective view of a rotary head milling attachment including the features of the present invention mounted upon a conventional horizontal milling machine;

FIG. 2 is a side elevational view, partially in section, of the rotary head milling attachment shown in FIG. 1;

FIG. 3 is an enlarged vertical sectional view through the pivot and slide support of the drive unit, taken along section line 3—3 in FIG. 2;

FIG. 4 is a vertical sectional view through the rotary head milling attachment, taken along section line 4—4 in FIG. 2;

FIG. 5 is a plan view of the spindle lock plate shown in FIG. 4;

FIG. 6 is a fragmentary plan view of the motor containing end of the drive unit frame or housing showing how the motor is supported for pivotal movement thereon; and FIG. 7 is an enlarged fragmentary, vertical sectional view taken along section line 7—7 in FIG. 6.

Referring now more particularly to FIG. 1, the rotary head milling attachment there shown is generally indicated by reference numeral 2. The milling attachment includes a main stationary frame or housing generally indicated by reference numeral 4 within which is rotatably mounted a spindle-carrying assembly generally indicated by reference numeral 8 and including a rotary frame unit 10 and a cross slide 12 mounted for translatory sliding movement on the rotary frame unit 10 along a line extending radially of the axis of rotation thereof. The position of the cross slide 12 upon the rotary frame unit 10 is adjusted by a hand wheel 16 and the angular position of the rotary frame unit 10 upon the main stationary frame or housing 4 is adjusted by a hand wheel 18. The cross slide 12 carries a vertical spindle-receiving tube 20 in which is rotatably mounted the milling tool carrying spindle 22. Partially supported upon the spindle-receiving tube 20 is the direct drive unit of the present invention generally indicated by reference numeral 24. The drive unit includes an electric motor 25 which drives the spindle through a variable speed pulley belt transmission in the preferred form of the invention. A switch box having an on-off switch 25' is attached to the motor for starting and stopping the motor. Except for the drive unit 24 and the manner in which it is related to the rest of the rotory head milling attachment, the milling attachment may be constructed in any manner well known in the art.

The milling attachment 2 may be used with practically any form of horizontal or vertical milling machine. To this end, the main stationary frame or housing 4 is provided with a securing flange or head 26 which may be attached to an adaptor piece 30 by any suitable means such as by bolts 28. The adaptor piece 30, of course, is designed to be mounted upon the particular milling machine involved, and thus may take a variety of forms. The adaptor piece 30 in the embodiment of the invention as illustrated in FIG. 1 is adapted to connect the milling attachment to the head portion 31 of a horizontal milling machine generally indicated by reference numeral 32. The milling machine includes the usual vertically and horizontally adjustable work table 34 upon which a work piece 36 may be securely mounted. The milling attachment 2 of the present invention extends above the work table 34.

Now that the various parts of the rotary head milling attachment have been briefly identified, the details thereof will now be described. The main stationary frame or housing 4 has a main cylindrical body 40 forming a housing for many of the rotatable parts of the milling attachment. The body 40 has a projecting portion 42 which rotatably supports a worm shaft 44 (FIG. 2) connected to hand wheel 18. The aforementioned securing flange 26 extends from the rear end of the body 40. A vertical cylindrical extension 46 (FIGS. 1 and 4) also extends from the body 40 and the extension 46 contains a vertical stop pin 48 held above the top of the body 40 by a screw 47.

Rotatably supported within the body 40 of the main stationary frame or housing 4 is the rotary frame unit 10. The rotary frame unit 10 includes a large worm gear 50 rotatably mounted within the cylindrical inner surface of the body 40. As shown in FIG. 2, the perimeter of the worm gear 50 is provided with gear teeth 51 which mesh with the worm shaft 44. An annular cover member 54 is secured by screws 55 to the worm gear 50. The cover member 54 has an inverted T-shaped slot 56 formed in the top thereof. The heads of a pair of studs 58—58 are mounted for sliding movement within the T-shaped slot on opposite sides of the stop pin 48. Stop blocks 62—62 are placed around the studs and the threaded shanks of the studs project above the cover member 54 to receive clamping nuts 60 which, when tightened, securely clamp both the studs 58 and respective blocks 62 in their adjusted positions on the cover member 54. The stop blocks 62 project outwardly beyond the perimeter of the cover member 54 and, in association with the aforementioned stop pin 48 extending upwardly from the stationary frame body 40, control the limits of rotation of the rotary frame unit. The outside of the cover member 54 is provided with scale markings 63 (FIG. 1) which, in cooperation with an index pointer 64 secured on the main stationary frame 4, indicate the angular position of the rotary frame unit 10.

The rotary frame unit additionally includes a cross slide carrier 65 which is fixed for rotation with the worm gear 50 by screws 66 (FIG. 4). The cross slide carrier 65 has formed on the bottom thereof a dove tail guideway 67 which slidably supports the correspondingly dove tailed upper portion 69 of the cross slide 12. The cross slide 12 is locked in any of its adjusted positions by means of a clamp assembly 71 comprising a clamp plate 73 having a bottom portion underlying the cross slide 12 and a threaded stud 75 passing through the clamping plate 73 and threading into the cross slide carrier 65. This stud 75 has a head 77 from which extends a handle 79, the head 77 underlying the clamping plate 73. When the stud 75 is tightened, the clamping plate 73 forces the cross slide 12 into frictional locking engagement with the bottom of the cross slide carrier 65 to lock the cross slide in its adjusted position. The cross slide carrier 65 is provided with scale markings 81 (FIG. 1) which, in cooperation with a suitable index mark on the cross slide 12 (not shown), indicates the position of the cross slide.

The cross slide carrier 65 rotatably supports the cross slide adjusting hand wheel 16 to which is connected an operating shaft 86 (FIG. 2) having external screw threads 86 which mesh with corresponding internal threads in sleeve members 88 secured to the cross slide 12 by screws 89. Rotation of the shaft 86 will thereby impart translatory movement to the cross slide 12.

The aforesaid spindle-receiving tube 20 is fixed to the cross slide 12 as by screws 92 (FIG. 4). The spindle 22 is rotatably mounted within the tube 20 of means of upper and lower bearing assemblies 96 and 98, respectively. The bottom of the spindle 22 has the usual tool-receiving opening 99 and a collet cap 100 threaded around the spindle bottom for securing a milling tool in place on the bottom of the spindle. A variable speed driven pulley belt-receiving unit 101 is fixed to the upper end of the spindle 22 in any suitable manner. The pulley unit 101 has a number of pulley belt-receiving sections 102 of progressively varying diameter around one of which extends a pulley belt 103 which is driven by the motor 25 forming part of the drive unit 24.

In accordance with the present invention, a unique drive-unit is provided for driving the driven pulley unit 101. The drive unit 24 as illustrated comprises an elongated frame or housing 104 shown most clearly in FIGS. 2 and 4. The housing 104 forms at one end a pulley guard which surrounds the outer half of the driven pulley unit 101. The housing 104 has a window or opening 105 through which part of the pulley belt transmission is readily visible. Extending upwardly from the other end of the housing 104 is the motor 25. The end of the housing 104 adjacent the driven pulley unit 101 has at the bottom thereof a downwardly extending cylindrical neck portion 108 rotatably mounted upon the upper end of the spindle-receiving tube 20. The bottom of the neck portion 108 rests on the top of a flange 110 extending from the tube 20. The pivot axis for the neck portion 108 of the drive unit is coextensive with the axis of rotation of the spindle 22 within the tube 20.

Spindle-locking means generally indicated by reference numeral 112 (FIGS. 4–5) is mounted upon the top of the portion of the drive unit housing 104 overlying the driven pulley unit 101. The spindle-locking means includes an elongated plate member 114 having a key-shaped slot 116 at the center thereof through which a hexagonal nut 118 connected to the top of the spindle 22 extends. The wide end 116' of the key-shaped slot 116 is much larger than the nut 118 so that the same may rotate freely therein. The narrow end 116" of the key-shaped slot 116 has a width approximately equal to the distance between the opposite flat faces of the head of the hexagonal nut 118 so that the nut and the spindle to which it is attached cannot rotate when the nut is in the narrow portion of the key-shaped slot. The elongated plate member 114 has longitudinal slots 120 and 122 respectively at opposite ends thereof which receive screws 124 and 126, respectively, which thread into the upper end of the drive unit housing 104. A handle 128 extends upwardly from one end of the elongated plate member 114. The slots 120 and 122 enable the elongated plate member 114 to be moved into opposite extreme positions when the nut 118 is respectively at the wide and narrow ends of the key-shaped slot 116. The screws 124 and 126 do not lock plate 114. The elongated plate member 114 may be moved in either of the two above mentioned positions so that the spindle may be selectively free to rotate or locked against rotation. In the locked position of the spindle, the milling tool may be inserted into the spindle bottom and locked in place by means of the aforesaid collet cap 100.

Pivot and slide means generally indicated by reference numeral 130 (FIG. 2) for pivotally and slidably supporting one end of the drive unit housing 104 is provided at the end of the drive unit housing 104 remote from the spindle 22 which end is located behind the work table 34. This means includes channeled slide unit 132 supported by a bracket 134 from the stationary frame body 40 of the milling attachment by machine screws 136. A cylindrical roller 138 mounted for rotation about a vertical axis rolls along the sides of a channel 140 of the channeled slide unit 132. The roller 138 which has a diameter slightly less than the width of the channel 140 is carried upon a roller retainer 142 which has a wide bottom portion 144 fitting within a correspondingly shaped opening 145 in the roller 138. The roller retainer has a reduced upper end or neck portion 146 which passes through a correspondingly shaped opening in the top of the roller 138. The roller retainer 142 is held in place upon the bottom of the drive unit housing 104 by a pivot screw 148 fitting into a threaded opening 150 formed in the center of the roller retainer 142. The screw 148 passes freely through the drive unit housing 104 so that the latter may pivot around the screw. A spacer member 151 extends around the neck portion of the roller retainer 142 above the roller 138. The spacer member slides along the top of the channeled slide unit 132.

The channel 140 in the channeled slide unit 132 extends along a line which passes through the axis of the spindle-receiving tube 20 which is also the pivot axis of the adjacent end of the drive unit housing 104. It is apparent that, with the construction and arrangement of the drive unit housing 104 and its relationship to the other parts of the milling attachment just described, the over-all movement of the drive unit is a combination pivoting and lineal sliding movement where, for even a maximum eccentric position of the cross slide 12, the path of travel of the drive unit housing 104 will occupy a small area relative to what it would occupy if it were carried only upon the cross slide, as the rotary frame unit is rotated to its fullest extent. Since the pivot and slide means 130 is located behind the feed table 34, the drive unit never moves into the operator's way.

In the preferred form of the invention, as above indicated, a pulley belt transmission is used for transmitting motion from the electric motor 25 to the spindle 22. To this end, the motor has a vertical depending shaft (not shown) which carries a pulley belt-receiving unit 151 of tapering diameter which is complementary to the driven pulley belt-receiving unit 101. The pulley belt 103 may be placed in any selected one of a number of belt-receiving sections 152 on the pulley unit 101.

To permit ready changing of the belt position to vary the speed of the spindle, the motor 25 is mounted for horizontal swinging movement upon top side frame arms 104'—104' of the drive unit housing 104. To this end, the housing of the motor is pivotally secured to one side of the drive unit housing by means of a vertical pivot stud 153 (FIGS. 6–7) passing through holes 154—155 respectively in one of the side frame arms 104' and the housing of the motor 25. A nut 156 locks the stud 153 in place. The other side of the motor housing may be selectively locked or unlocked to the other frame arm 104' of the drive unit housing 104 by means including a vertical stud 157 passing through a circumferentially extending slot 158 in the latter side frame arm 104' and through an opening 160 in the motor housing. A nut 162 is threaded over the upper threaded end of the stud 157. An operating handle 164 having an internally threaded hub 166 is threaded around the threaded bottom end of the stud 157. When the handle 164 is rotated in a clockwise direction as viewed from above, the connection between the motor housing and the drive unit frame arms 104' is loosened enabling the motor to be shifted toward the driven pulley belt-receiving unit 101, so that the pulley belt 102 may be loosened and shifted to a new position. When the handle 164 is rotated in a counterclockwise direction as viewed from above, the connection between the motor housing and the drive unit frame arms 104' is tightened, to thereby lock the motor in a position where the pulley belt 102 is tightened, so that rotary motion is transmitted between the drive and driven pulley belt-receiving units 101 and 151.

The present invention provides a rotary head milling attachment of simple, rugged and inexpensive construction which includes a direct drive unit constructed and arranged so that the milling attachment need not support the full weight of the motor which is in part supported by the stationary frame or housing 40 thereof. Also, the direct drive unit is supported for both pivotal and sliding movement upon the stationary frame so that the path of movement of the drive unit encompasses a minimum of space as the rotary frame unit thereof is rotated. By locating the pivot and slide support so that it will be located at or behind the rear portion of the work table of the milling machine with which the attachment is used, the drive unit will not obstruct the operator's view of the work piece.

It should be understood that numerous modifications may be made of the preferred form of the invention above described without deviating from the broader aspects of the invention.

What I claim as new and desire to protect by Letters Patent of the United States is:

A rotary head milling attachment comprising: a main frame including a mounting head for removably attaching the same to the frame of a milling machine above the work table thereof and a cylindrical body portion; a spindle-carrying assembly carried in said cylindrical body portion of said main frame and comprising: a rotary frame unit rotatably supported in said cylindrical body portion of said main frame, manual control means for adjusting the degree of rotation of said rotary frame unit in said cylindrical body portion of the main frame, a cross slide mounted upon said rotary frame for linear movement in a direction at right angles to the axis of rotation of said rotary frame, manual control means for adjusting the position of said cross slide on said rotary frame unit, and a spindle-receiving tube fixed upon said cross slide and extending about an axis parallel to the axis of rotation of said rotary frame unit; a spindle rotatably supported within said tube, the eccentricity of the spindle axis relative to the axis of rotation of said rotary frame unit being variable with the position of adjustment of said cross slide on said rotary frame unit; a driven pulley secured to the upper end of said spindle; and a direct drive unit for said driven pulley comprising: a pulley transmission housing forming an outer enclosure for the top of the attachment, said housing enclosing said driven pulley and pivotally mounted on and carried by the cross slide at the top of said spindle-receiving tube, an electric motor carried by and at the top of the other end of said pulley transmission housing and having a depending shaft carrying a drive pulley contiguous to said driven pulley and located within said housing, a single pulley belt directly connected between the drive and driven pulleys, and means pivotally and slidably supporting said other end of said housing on said cylindrical body portion.

References Cited in the file of this patent

UNITED STATES PATENTS

| 2,069,299 | Bartholomew | Feb. 2, 1937 |
| 2,289,111 | Fett | July 7, 1942 |
| 2,549,024 | Siepe | Apr. 17, 1951 |
| 2,605,677 | Armitage | Aug. 5, 1952 |